Dec. 2, 1969    J. H. LA PENTA    3,481,637
SHAFT KEEPER CLIP
Filed June 11, 1968
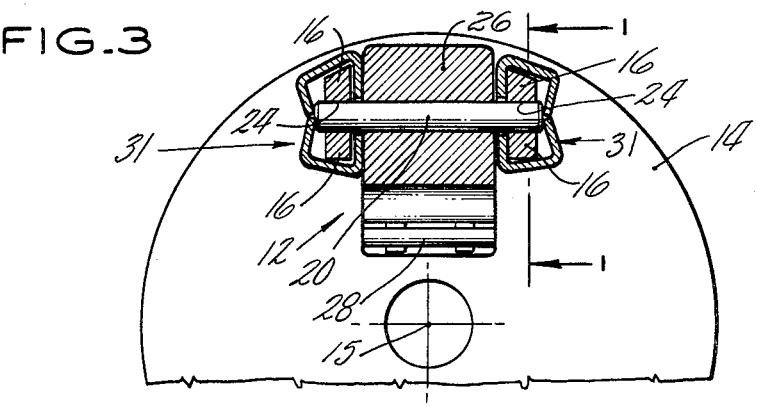
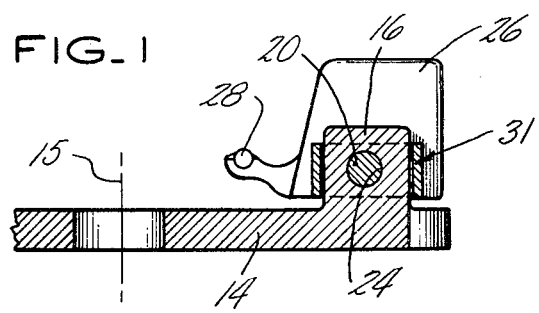
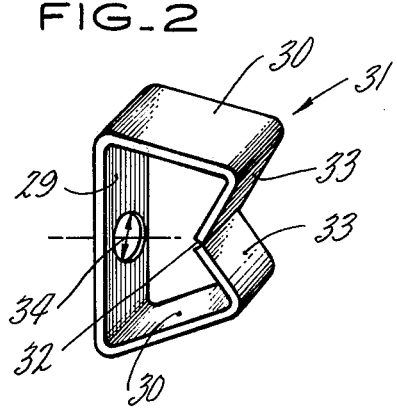
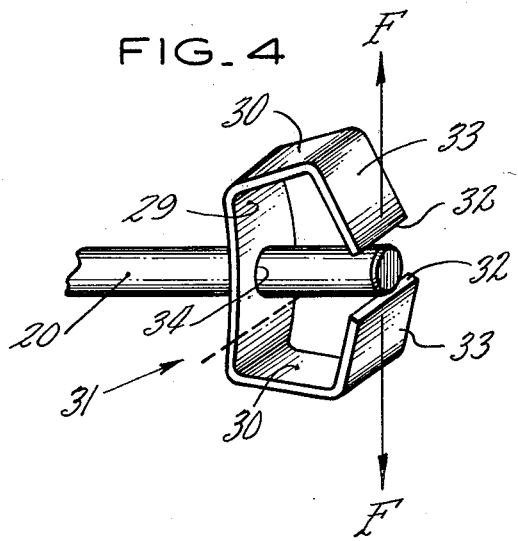
INVENTOR
JOSEPH H. LaPENTA
BY Radford W. Luther
ATTORNEY United States Patent Office 3,481,637
Patented Dec. 2, 1969

3,481,637
SHAFT KEEPER CLIP
Joseph H. La Penta, Hartford, Conn., assignor to Chandler Evans Inc., Hartford, Conn., a corporation of Delaware
Filed June 11, 1968, Ser. No. 736,035
Int. Cl. F16b 2/24; F16c 11/04
U.S. Cl. 287—100                                 6 Claims

ABSTRACT OF THE DISCLOSURE

A pivot shaft keeper clip having an apertured base portion, integral arms, and fingers is to be slideably mounted on a shaft support abutment, the shaft extending through the base portion aperture and into a bore which extends through the abutment thereby fixing the keeper clip against sliding movement with respect to the abutment; the arms and fingers wrapping about the abutment surface to block the outboard entrance to the bore and to thereby prevent movement of the shaft beyond the outboard face of the abutment unless a force is purposely applied to spread the fingers and thereby expose the bore.

BACKGROUND OF THE INVENTION

Fasteners whose function relies upon permanent deformation rather than elastic deformation are relatively unreliable since the possibility of material breakage is increased once the yield stress has been exceeded. In complex assemblies a broken fastener fragment could easily go unnoticed and result in malfunction of the assembly; or if noticed, the removal might exact considerable effort and expense. Hence, while the configuration disclosed would function whether the deformation of the clip to permit passage of the pin therethrough is elastic or inelastic, a preferred clip material will possess such a high yield strength that functionally required deformations will not be permanent.

Examples of fastening means positioned by inelastic deformation would include lockwire and cotter pins whereas conventional snap rings are an example of a fastener utilizing elastic deformation at installation.

SUMMARY OF THE INVENTION

A shaft keeper clip has arms and fingers which embrace an abutment member, the clip retained thereon by the shaft passing through the member and through the body of the clip, the fingers restraining the pin against axial movement in one direction.

It is an object of this invention to provide a simple inexpensive and reliable clip which will permit ready installation and removal of a pivotably mounted flyweight in a speed control apparatus, wherein the novel device retains the pivot shaft which supports the flyweight.

The clip described would function equally well in any situation where an axially slideable shaft or pin is to be held between two abutments such as retention of a clevis pin in a clevis yoke used in rigging cable, or such as an oar pinned in the oarlock of a rowboat.

This and other objects of the invention will become readily apparent from the following description and claims taken in connection with the accompanying drawings forming a part of this application.

BRIEF DESCRIPTION OF THE DRAWINGS

FIGURE 1 is a fragmented elevation view of a preferred form of the invention utilized to retain the pivot shaft of a flyweight pivotable mounting arrangement.

FIGURE 2 is a detailed isometric view of the preferred form of the clip shown in FIGURE 1.

FIGURE 3 is a plan view partially in section.

FIGURE 4 is an isometric view illustrating force-elastic deformation for shaft removal.

DESCRIPTION OF THE PREFERRED EMBODIMENTS

Referring to FIGURES 1 and 3, wherein a flyweight assembly is shown generally at 12, and a rotating mounting plate 14 adapted to rotate about axis 15 has yoke forming spaced apart abutments 16 protruding normally therefrom, a flyweight mounting shaft 20, of a uniform diameter, is slideably fitted within aligned through bores 24 in abutments 16, bores 24 being substantially parallel to the upper surface of circular plate 14. Shaft 20 has mass 26 pivotably mounted thereon with the center of gravity of mass 26 being located at a greater distance normal to plate 14 than is shaft 20 whereby rotation of plate 14 causes the centrifugal force exerted by mass 26 to provide a moment about the axis of shaft 20. Said moment is balanced by a reaction force applied to reaction surface 28 by an output motion linkage member (not shown). Shaft 20, which is slideable in bore 24, is prevented from sliding out of bore 24 under the influence of a vibratory field or shock or acceleration loads by spring forces exerted against the ends of shaft 20 by clip 31 and particularly by end surfaces 32 of fingers 33.

Referring to FIGURE 2, wherein an isometric view of clip 31 is shown with aperture 34 in the base 29 sized to permit shaft 20 to pass therethrough when, in the assembly, the base segment 29 containing aperture 34 is positioned against the face of abutment 16 between the inboard face of abutment 16 and mass 26. It should be noted that the precise geometric shape of the cross section of abutment 16 has relatively little effect on the operation of keeper clip 31 provided clip 31 is fabricated and positioned to cooperate therewith so that the free ends 32 of clip 31 will cover a portion of the outboard area of bore 24 to form an obstacle to shaft removal as illustrated in FIGURE 3.

FIGURE 4 illustrates the general configuration the clip 31 will assume when spreading forces F are applied to surfaces 32 to permit passage of shaft 20 therebetween during assembly or disassembly of pin 20 with the abutments. It is evident from FIGURE 4 that, although the preferable clip form has two arms, if aperture 34 in the base 29 is sized to fit the shape of shaft 20 very closely, by making the shape of the aperture closely approximate a transverse cross-section of the shaft a reaction moment will be provided through pin 20 and the base 29 of fastener 31 to balance the moment caused by force F, force F acting on fingers 33 of clip 31, hence the base 29 of clip 31 could be cut along the dashed line and the remaining portion would still function with a resilient single angularly extending arm 30 and angularly extending finger 33 positioned to restrain axial movement of pin 20 in bore 24.

One method of installing flyweight mass 26 between abutments 16 is to slide clips 31 onto abutments 16 so that the base 29 of clips 31 are positioned against the inboard faces of abutments 16, and apertures 34 in bases 29 are aligned with bores 24 in abutments 16. The spring forces exerted by fingers 33 of clips 31 against the outboard faces of abutments 16 will temporarily retain aperture 34 and bore 24 in alignment at one abutment 16, while at the other abutment 16 the fingers 33 of clip 31 are caused to be spread enough to expose the full diameter of bore 24 at the outboard face of abutment 16, and shaft 20 is caused to pass between fingers 33 of clip 31 and to enter bore 24 of abutment 16. Shaft 20 is axially advanced through the abutment 16 and aperture 34 of clip 31 until the leading edge of shaft 20 is about to emerge from base 29, whereupon fingers 33 of clip 31 are released from the spread position and permitted to grasp shaft 20 and temporarily fix the degree of axial engagement of shaft 20 with respect to abutment 16. Since the leading edge of shaft 20 has then already penetrated base 29 of clip 31, clip 31 is no longer free to move up or down on abutment 16 without first shearing shaft 20. Flyweight mass 26 is then placed between the bases 29 of clips 31 such that the mounting passageway in flyweight mass 26 is aligned with bores 24 in abutments 16, whereupon an axial force is applied to shaft 20, the axial force being sufficient to overcome the frictional drag caused by the spring forces which fingers 33 of clip 31 exert against shaft 20. The leading end of shaft 20 is thus advanced axially to penetrate the mounting passageway in flyweight mass 26 and to travel until aperture 34 of the opposite clip 31 has been traversed and shaft 20 enters bore 24 in opposite abutment 16. When the lagging end of shaft 20 approaches the outboard face of abutment 16, shaft 20 will no longer separate fingers 33 of clip 31 and internal spring forces will cause these fingers 33 to reduce the gap therebetween and occupy a position which prevents return travel of shaft 20 until such time as fingers 33 are again intentionally spread apart. Additional forward travel of shaft 20 will be similarly opposed by fingers 33 of clip 31 positioned on the opposite abutment 16.

While I have illustrated and described a preferred embodiment of my invention, it is to be understood that such is merely illustrative and not restrictive and that variations and modifications may be made therein without departing from the spirit and scope of my invention. I, therefore, do not wish to be limited to the precise details set forth, but desire to avail myself of such changes as fall within the purview of my invention.

What I claim is:

1. A clip designed to limit axial movement of a pin axially slideably disposed between and through a pair of spaced apart abutments comprising; a base having an aperture therethrough, the shape of said aperture closely approximating a transverse cross-section of the pin; said base enveloping a portion of the pin adjacent to the inboard face of an abutment; a pair of resilient arms having fingers thereon extending from said base with one of said resilient arms extending angularly from said base to embrace said abutment; and the fingers on said arms extending angularly from said arms to a point opposite the aperture in said base on the outboard side of said abutment whereby axial movement of the pin beyond the outboard face of an abutment is blocked by said finger and axial movement of the clip on said abutment is blocked by said pin, and one arm of said pair being perpendicular to the base and the other arm forming an acute interior angle with the base.

2. A shaft keeper assembly comprising; a surface having two spaced apart abutments protruding upwardly therefrom, each of said abutments having a bore extending from an inboard face thereof to an outboard face thereof, an axially slideable shaft received in each aperture lying over the surface, two clips each including a base having an aperture therethrough, at least one resilient arm extending angularly from said base and at least one finger extending angularly from said arm to a position in alignment with said aperture; the base of each clip positioned adjacent an inboard face of its respective abutment with the aperture slidingly receiving said shaft, the fingers of each clip extending to positions adjacent the outboard face of its respective abutment and in alignment with the respective bores and restraining axial movement of said shaft.

3. A shaft keeper assembly, as described in claim 2, wherein the shape of said aperture closely approximates a transverse cross-section of the pin.

4. A shaft keeper assembly, as described in claim 2, wherein two arms extend angularly from said base and a finger extends from each arm.

5. In combination, an element having two spaced abutments each having an inboard face and an outboard face and a bore in each abutment extending between said faces, said bores being in alignment, a uniform diameter shaft axially slideable in said bores, means limiting axial movement of said shaft comprising a pair of spring clip members, one for each abutment, each member having a base located adjacent the inboard surface of its respective abutment and having an aperture therethrough in alignment with said bores, receiving said shaft, conforming to the transverse cross-section of said shaft and preventing movement of said base transversely of said shaft, at least one spring arm extending outwardly from each said base, around its respective abutment and spring urged to a position adjacent the outboard face of its respective abutment and in alignment with said bores transversely of said shaft, the arm of one member movable against said spring urging to permit axial sliding of said shaft in one direction past said outwardly moved arm, through the respective bore, through the respective base aperture, through the other base and other abutment to a position in which one end of said shaft is against the spring arm of the other member, said last mentioned spring arm preventing movement of said shaft in one direction, the spring arm of said one member spring arm urged to a position across the other end of said shaft and preventing axial sliding of said shaft in the opposite direction.

6. The combination of claim 5, wherein each base has two spring arms.

References Cited

UNITED STATES PATENTS

| 1,453,471 | 5/1923 | Le Tarte. |
| 1,519,765 | 12/1924 | Crone. |
| 1,536,568 | 5/1925 | Crone _____ 85—5.5 XR |
| 1,598,401 | 8/1926 | Sparrow _____ 85—5.5 |
| 2,984,878 | 5/1961 | Hartman et al. |

FOREIGN PATENTS

| 1,302,866 | 7/1962 | France. |

DAVID J. WILLIAMOWSKY, Primary Examiner

ANDREW V. KUNDRAT, Assistant Examiner

U.S. Cl. X.R,

85—5.5

PO-1050
(5/69)

UNITED STATES PATENT OFFICE
CERTIFICATE OF CORRECTION

Patent No. 3481637      Dated December 2, 1969

Inventor(s) Joseph H. LaPenta

It is certified that error appears in the above-identified patent and that said Letters Patent are hereby corrected as shown below:

Column 4, line 15 after "spaced" insert -- apart --.

SIGNED AND
SEALED
MAY 12 1970

(SEAL)
Attest:

Edward M. Fletcher, Jr.
Attesting Officer

WILLIAM E. SCHUYLER, JR.
Commissioner of Patents